United States Patent [19]
Kassai

[11] Patent Number: 4,650,252
[45] Date of Patent: Mar. 17, 1987

[54] BABY CARRIAGE SEAT BELT

[75] Inventor: Kenzou Kassai, Osaka, Japan

[73] Assignee: Aprica Kassai Kabushikikaisha, Osaka, Japan

[21] Appl. No.: 811,666

[22] Filed: Dec. 20, 1985

[30] Foreign Application Priority Data

Dec. 22, 1984 [JP] Japan .......................... 59-194782[U]

[51] Int. Cl.[4] ............................................. A47C 31/00
[52] U.S. Cl. .................................... 297/467; 297/464; 297/DIG. 4
[58] Field of Search ............... 297/216, 464, 450, 467, 297/473, DIG 4

[56] References Cited

U.S. PATENT DOCUMENTS

| | | | |
|---|---|---|---|
| 1,712,198 | 5/1929 | Clapp | 297/473 |
| 2,888,063 | 5/1959 | Rose | 297/473 |
| 3,028,200 | 4/1962 | Dye | 297/473 |
| 3,529,864 | 9/1970 | Rose et al. | 297/473 X |
| 4,542,915 | 9/1985 | Wheeler et al. | 297/DIG. 4 |

*Primary Examiner*—James T. McCall
*Attorney, Agent, or Firm*—W. G. Fasse; D. H. Kane, Jr.

[57] ABSTRACT

A baby carriage has a seat belt with an annular belt section and a flexible belt connecting section. The annular belt section has disengageable buckles at its opposite ends. When the buckles are engaged with each other, the annular belt section surrounds the entire periphery of a baby's torso including his back with the baby placed on the seat of a baby carriage. The flexible belt connecting section connects the annular belt section to the lower end of the backrest of the baby carriage with a fixed spacing between the backrest and the seat belt proper to prevent a child from standing up.

6 Claims, 7 Drawing Figures

BABY CARRIAGE SEAT BELT

FIELD OF THE INVENTION

This invention relates to a baby carriage seat belt for preventing a baby in the baby carriage from slipping out of the seat belt and for standing up on the seat.

DESCRIPTION OF THE PRIOR ART

Baby carriage seat belts are indispensable for securing the safety of babies, and various regulations are prescribed by safety standards for the purpose of ensuring that the safety features of the seat belt properly function. For example, the Japanese Safety Standards make it obligatory to provide a crotch belt for the purpose of preventing a baby on the seat from forwardly slipping off the seat; thus, all the baby carriages now on the market should have such crotch belts attached thereto.

In this connection it is to be noted that in a period when a baby is still too small to stand up alone, the seat belt having a crotch belt simply added thereto will provide sufficient safety. However, when a baby becomes about one year old, the baby can become active enough to slip out of the seat belt and to stand up on the baby carriage seat which can be dangerous. FIG. 7 is a perspective view of a baby carriage having a conventional seat belt. This seat belt 1 extends from opposite sides of a backrest 2 to surround the sides and abdomen of a child seated on a seat 3. Therefore, the conventional seat belt does not extend along the back of the child; the back of the child is only restrained by the backrest 2. The child can easily slip out of the seat belt by stretching himself pressing the feet against the front edge of a step 4 or of the seat 3 with his back sliding along the backrest. Such movement is very dangerous to babies and the U.S. Safety Standards have prescribed physically concrete regulations. The Japanese Safety Standards have no such regulations at present, relying solely on parents's care for prevention of dangers.

SUMMARY OF THE INVENTION

With the above in mind, this invention aims at solving these problems, and it is an object of the invention to provide a baby carriage seat belt adapted to prevent a baby seated in a baby carriage from slipping out of the seat belt and to also prevent the baby from standing up on the seat.

A baby carriage seat belt according to this invention comprises disengageable buckles attached to the opposite ends thereof, an annular belt adapted to surround the entire periphery of the torso of a baby including the baby's back when said buckles are engaged after a baby has been placed on the seat of the baby carriage, and a flexible connecting section for connecting said annular belt to the body of the baby carriage so that a rear portion of the annular belt is spaced at a certain distance or spacing from the lower end of the backrest of the baby carriage.

The seat belt of the invention is so arranged that the annular belt always wraps around the torso of the baby in the baby carriage irrespective of the baby's posture, preventing the baby from slipping out of the annular belt section downwardly or upwardly, while the freedom of the baby's movement is allowed to a suitable extent since the rear portion of the annular belt is connected to the baby carriage at a certain distance from the center of the lower end of the backrest by the flexible connecting section, thus securing safety.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
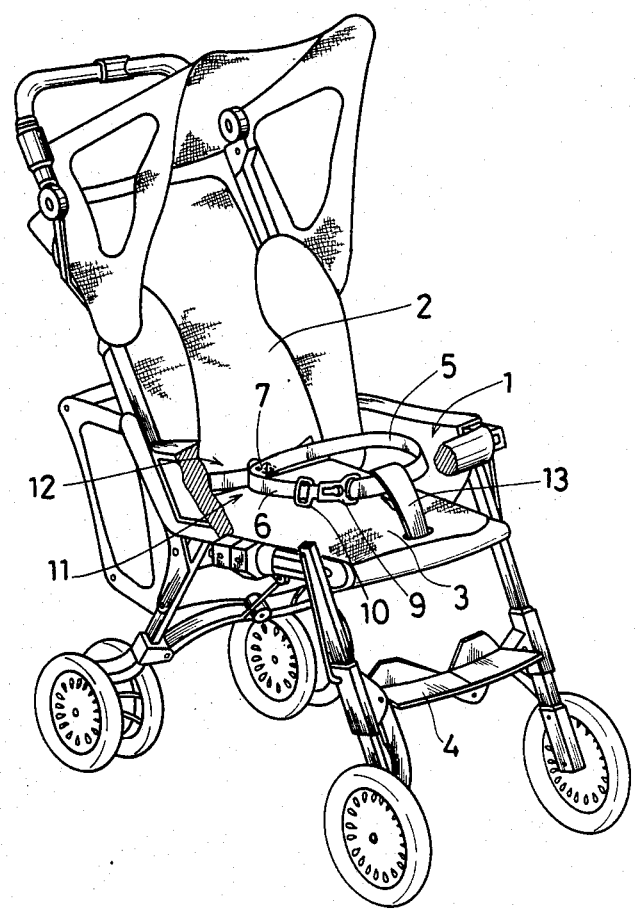
FIG. 1 is a perspective view, partly broken away, of a baby carriage having a seat belt according to the invention.
Figure 2:
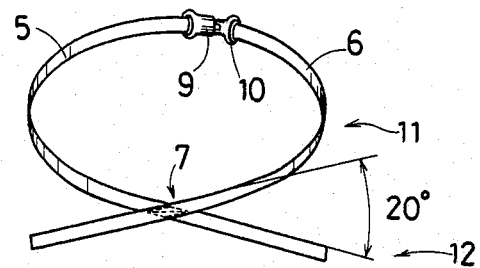
FIG. 2 is a perspective view of the seat belt of FIG. 1.
Figure 3:
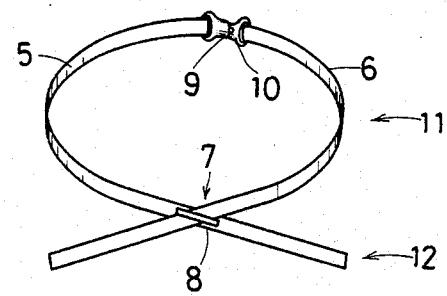
FIGS. 3 to 6 show perspective views of seat belts according to other enbodiments of the invention.

As shown in FIG. 1, an annular seat belt 1 according to an embodiment of the invention has two belt members 5 and 6 extending forwardly from the lower end of a backrest 2. The rear ends of the belt members 5 and 6 are connected to the baby carriage with a certain spacing so that a rear portion of the annular belt, for example a belt crossing region 7 is spaced from the lower backrest end and so that the annular seat belt is at or below the sides of the waist of a child seated on a seat 3. The rear ends of the belt members 5 and 6 are brought to the rear side of the backrest 2 and connected directly thereto or to a frame member (not shown) of the baby carriage body. The belt members 5 and 6 extend somewhat upwardly and forwardly from the positions of their rear ends to cross each other and are joined together to form said crossing region 7 for example by sewing them together as shown in FIG. 2 or by forming one belt member 5 with a belt loop 8 adapted to receive the other belt member 6 and inserting the other belt member 6 into said one belt member 5, as shown in FIG. 3.

The front ends of the belt members 5 and 6 have a pair of buckles 9 and 10 attached thereto. Engagement of the buckles 9 and 10 results in the belt members 5 and 6 forming an annular belt section 11 extending from the cross region 7 to the buckles 9 and 10. In addition, the belt members 5 and 6 are adapted to have their length adjusted at the attaching portion of either of the buckles 9 and 10. The belt members 5 and 6 form a flexible connecting section 12 extending from the rear ends to the cross region 7 of the belt members, so that the annular belt section 11 or rather its rear portion is held at a fixed spacing from the lower end of the backrest 2. As for the angle which the belt members 5 and 6 form at the cross resion 7, an angle of about 20 degrees is effective in preventing a child from slipping out and is preferable from the standpoint of allowing the freedom of the baby's movement to some extent.

The seat 3 is provided with a crotch belt 13 extending upwardly from approximately the middle of the front edge of the seat 3, the upper end of said crotch belt 13 being looped to receive the belt member 5 or 6.

With the seat belt 1 constructed in the manner described above, the annular belt section 11 surrounds the entire periphery of the torso of a baby placed on the seat 3 of the baby carriage, with the result that even if the baby stretches the legs against the front edge of the step 4 or seat 3 in an effort to slide up along the backrest 2, there is no danger of the annular belt section 11 being disengaged from the baby's torso; it limits the baby's movement to the range allowed by the flexible connecting section 12. Therefore, the baby cannot stand up on the seat 3 and hence safety is assured. As compared with the case where the annular belt section 11 is directly attached to the backrest 2, the baby is allowed a suitable degree of freedom of movement within the range allowed by the flexible connecting section 12.

Figure 4:
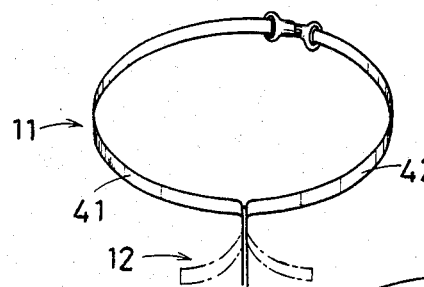
Figure 5:
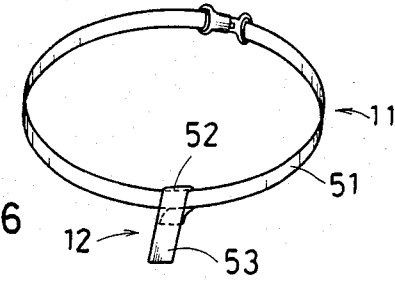
Figure 6:
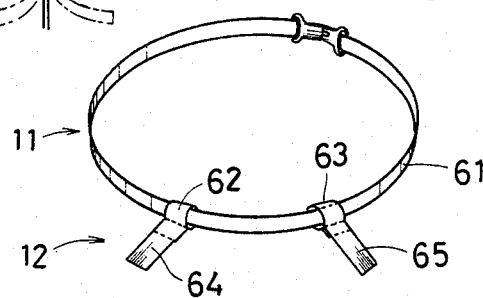
Figure 7:
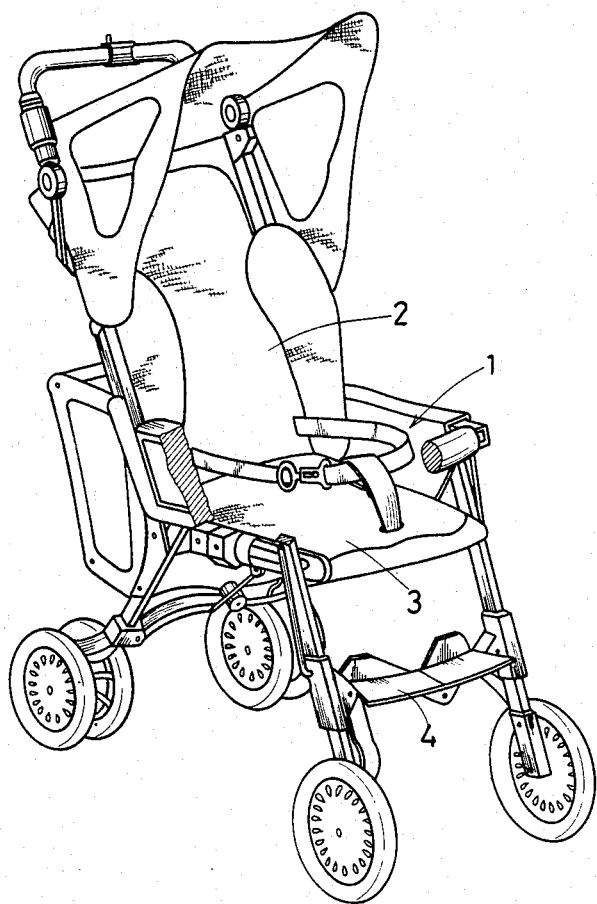
FIG. 7 is a perspective view, partly broken away, of a baby carriage having a conventional seat belt.

FIGS. 4 to 6 show other embodiments.

In the embodiment shown in FIG. 4, two belt members 41 and 42 are bonded together at one of their respective ends to form a flexible connecting section 12 and an annular belt section 11 which is split.

In the embodiment shown in FIG. 5, a single belt member 51 forms an annular belt section 11 and another belt member 53 having a ring portion 52 for receiving the belt member 51 forms a flexible connecting section 12.

In the embodiment shown in FIG. 6, a single belt member 61 forms an annular belt section 11 and belt members 64 and 65 having ring portions 62 and 63 form a flexible connecting section 12.

In addition, as shown in phantom lines in FIG. 4, the flexible connecting section 12, which have the two belt members 41 and 42 bonded together only at the boundary of the annular belt section 11, may have the other portions separated from each other.

Although the present invention has been described and illustrated in detail, it is clearly understood that the same is by way of illustration and example only and is not to be taken by way of limitation, the spirit and scope of the present invention being limited onlty by the terms of the appended claims.

What is claimed is:

1. A baby carriage, comprising a baby carriage body and including a seat, a backrest and armrests, annular seat belt means including disengageable buckles at the opposite ends thereof adapted to surround the entire periphery of a baby's torso when a baby is placed on said seat of said baby carriage with said buckles engaged with each other, a flexible belt connecting section (12) connecting a rear portion of said annular seat belt means to said baby carriage so that said rear portion of said seat belt means is held at a fixed spacing from a lower end of said backrest of said baby carriage, whereby said annular seat belt is in a location at or below the waist of a child seated on said seat, and crotch belt means (13) connecting a front portion of said annular seat belt means to said baby carriage for keeping said annular seat belt means in said location to thereby prevent a child from standing up on said seat and from sliding down out of said seat but permitting a certain horizontal movement within a range determined by said fixed spacing of said flexible belt connecting section.

2. The baby carriage of claim 1, wherein said annular seat belt means and said flexible belt connecting section (12) are formed of two belt members which are fixed at their rear ends to the body of said baby carriage and which extend forwardly from said backrest to cross each other at said fixed spacing, means joining said belt members where they cross each other to form a crossing resion (7), said two belt members having rear portions extending from said backrest to said crossing region (7) for defining said fixed spacing, said two belt members further having two front portions extending forwardly from said crossing resion (7) for forming a seat belt.

3. The baby carriage of claim 2, wherein said two belt members are sewn together at their crossing region (7).

4. The baby carriage of claim 2, wherein one of said two belt members comprises a belt loop for receiving the other belt member, and wherein said two belt members are joined together in that said other belt member is inserted through said belt loop.

5. The baby carriage of claim 1, wherein said annular seat belt means comprise a single belt member.

6. The baby carriage of claim 1, wherein said flexible belt connecting section (12) comprises a single belt member.

* * * * *